United States Patent
Aono

(10) Patent No.: US 9,137,430 B1
(45) Date of Patent: Sep. 15, 2015

(54) IMAGE CAPTURING SYSTEM

(71) Applicant: PFU LIMITED, Ishikawa (JP)

(72) Inventor: Sousuke Aono, Ishikawa (JP)

(73) Assignee: PFU LIMITED, Ishikawa (JP)

(*) Notice: Subject to any disclaimer, the term of this patent is extended or adjusted under 35 U.S.C. 154(b) by 0 days.

(21) Appl. No.: 14/309,644

(22) Filed: Jun. 19, 2014

(30) Foreign Application Priority Data

Mar. 18, 2014 (JP) ................................. 2014-055590

(51) Int. Cl.
| | |
|---|---|
| H04N 5/225 | (2006.01) |
| H04N 1/00 | (2006.01) |
| H04N 5/232 | (2006.01) |
| H04N 1/195 | (2006.01) |
| G03B 17/56 | (2006.01) |
| G03B 15/04 | (2006.01) |

(52) U.S. Cl.
CPC .............. *H04N 5/2251* (2013.01); *G03B 15/04* (2013.01); *G03B 17/561* (2013.01); *H04N 1/00535* (2013.01); *H04N 1/00562* (2013.01); *H04N 1/19594* (2013.01); *H04N 5/2256* (2013.01); *H04N 5/23229* (2013.01); *H04N 5/23293* (2013.01); *H04N 2201/0081* (2013.01); *H04N 2201/0096* (2013.01)

(58) Field of Classification Search
CPC .......... H04N 1/00535; H04N 1/00562; H04N 1/19594; H04N 5/2251; H04N 5/2256; H04N 2201/0081; H04N 2201/0096; G03B 15/04; G03B 17/561
See application file for complete search history.

(56) References Cited

U.S. PATENT DOCUMENTS

| 7,706,673 | B1* | 4/2010 | Staudinger et al. ............. 396/58 |
| 8,559,063 | B1* | 10/2013 | Booppanon et al. .......... 358/302 |
| 2002/0186317 | A1* | 12/2002 | Kayanuma ..................... 348/373 |
| 2005/0088528 | A1* | 4/2005 | Sambongi et al. ........ 348/207.11 |
| 2005/0088543 | A1* | 4/2005 | Yoshii ............................. 348/239 |
| 2006/0077286 | A1* | 4/2006 | Wenderski ..................... 348/373 |
| 2006/0152639 | A1* | 7/2006 | Yoon et al. ......................... 349/6 |

(Continued)

FOREIGN PATENT DOCUMENTS

| JP | 08-018831 A | 1/1996 |
| JP | 2004-104566 A | 4/2004 |

(Continued)

OTHER PUBLICATIONS

Decision of Patent Grant Japanese Patent Application No. 2014-055590 dated May 19, 2015 with full English translation.

*Primary Examiner* — Daniel M Pasiewicz

(74) *Attorney, Agent, or Firm* — McDermott Will & Emery LLP

(57) ABSTRACT

An image capturing system includes a portable image capturing device and a lighting apparatus. The portable image capturing device includes, an image capturing unit, a display unit that displays a photographed image and a control unit. The lighting apparatus includes, a base unit including an image-capturing-device mounting face on which the portable image capturing device is mounted to photograph the medium installation face, a mirror to reflect the image displayed on the display unit, and a mirror detector that detects that the mirror is arranged. The control unit corrects a distortion in the image displayed on the display unit when the mirror is not detected by the mirror detector, and corrects the distortion and performs vertical inversion of the image on the display unit when the mirror is detected by the mirror detector. Corrected image is displayed on the display unit.

3 Claims, 14 Drawing Sheets

(56) References Cited

U.S. PATENT DOCUMENTS

| | | | |
|---|---|---|---|
| 2009/0093274 A1* | 4/2009 | Yamamoto | 455/566 |
| 2009/0128715 A1* | 5/2009 | Makino | 348/744 |
| 2010/0290717 A1* | 11/2010 | Hsu | 382/312 |
| 2011/0091195 A1* | 4/2011 | Goldberg et al. | 396/419 |
| 2013/0176412 A1* | 7/2013 | Chen | 348/77 |
| 2014/0160350 A1* | 6/2014 | Takabatake et al. | 348/376 |

FOREIGN PATENT DOCUMENTS

| | | |
|---|---|---|
| JP | 2005-062753 A | 3/2005 |
| JP | 2008-096505 A | 4/2008 |
| JP | 3181070 U | 1/2013 |
| JP | 2013-106279 A | 5/2013 |
| WO | 2013111278 A1 | 8/2013 |

\* cited by examiner

IMAGE CAPTURING SYSTEM

CROSS-REFERENCE TO RELATED APPLICATIONS

The present application claims priority to and incorporates by reference the entire contents of Japanese Patent Application No. 2014-055590 filed in Japan on Mar. 18, 2014.

BACKGROUND OF THE INVENTION

1. Field of the Invention

The present invention relates to an image capturing system.

2. Description of the Related Art

In recent years, portable image capturing devices are spreading, which increases opportunities for readily photographing an image. In the photographing, a user visually confirms a display unit included in the portable image capturing device to confirm a photographed state of an object in the portable image capturing device. In this case, when the user visually confirms an image displayed on the image display unit, in some cases, it may be difficult for the user to directly visually confirm the image displayed on the display unit depending on a positional relation between the user and the display unit. In such a case, it enables the user to confirm the image displayed on the display unit to reflect the image displayed on the display unit by using a reflection member such as a mirror and to cause the reflected image to be visually confirmed (for example, refer to Japanese Patent Application Laid-open No. 8-18831 and Japanese Patent Application Laid-open No. 2004-104566).

When the user visually confirms the image displayed on the display unit reflected by the reflection member, the image is vertically or horizontally inverted with respect to the image displayed on the display unit. A distortion may occur in the image reflected by the reflection member depending on a positional relation between the display unit and the reflection member. Therefore, when the user visually confirms the image on the display unit via the reflection member, in order for the user to correctly confirm the image, the image needs to be inverted when displayed on the display unit or the display needs to be performed while considering the distortion due to reflection by the reflection member. Accordingly, the inverted image displayed on the display unit is inverted and reflected by the reflection member, so that the user can visually confirm the image in a regular direction and without a distortion.

However, when the user visually confirms the image displayed on the display unit on the premise that the image is visually confirmed while being reflected by the reflection member, the user cannot correctly confirm the image. In particular, in a case in which the display unit is a display unit that displays an photographing range of a static image by successively displaying images photographed by the image capturing device, when the user cannot correctly confirm the image displayed on the display unit, it may be difficult to perform desired photographing. As described above, in the image capturing device where the image on the display unit may be visually confirmed via the reflection member, since the user cannot correctly confirm the image displayed on the display unit, it is significantly difficult to for the user to appropriately photograph the object.

SUMMARY OF THE INVENTION

It is an object of the present invention to at least partially solve the problems in the conventional technology. According to an aspect of the invention, an image capturing system comprises a portable image capturing device that includes, an image capturing unit, a display unit that displays an image photographed by the image capturing unit, and a control unit configured to control the portable image capturing device; and a lighting apparatus that includes, a base unit disposed on a medium installation face on which a medium can be placed, an arm unit extending upward from the base unit, a top unit extending from the arm unit and facing the medium installation face, an image-capturing-device mounting face arranged on the top unit and on which the portable image capturing device is mounted so that the image capturing unit can photograph the medium installation face, a lighting unit that irradiates the medium installation face with light, a mirror that is arranged above the image-capturing-device mounting face to reflect the image displayed on the display unit toward the medium installation face, and a mirror detector that detects that the mirror is arranged. The lighting apparatus and the portable imaging device communicate with each other, and the control unit performs first image correction processing for correcting a distortion in the image that occurs corresponding to a positional relation between the image capturing unit and the medium installation face and displays the corrected image on the display unit when the mirror is not detected by the mirror detector, or performs second image correction processing for correcting the distortion and a vertical inversion of the image and displays the corrected image on the display unit when the mirror is detected by the mirror detector.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes an embodiment of an image capturing system according to the invention in detail with reference to drawings. The invention is not limited by the embodiment. Components described in the embodiment below include a component that can be replaced with other component by those skilled in the art, an easily available component, or substantially the same component.

Figure 1:
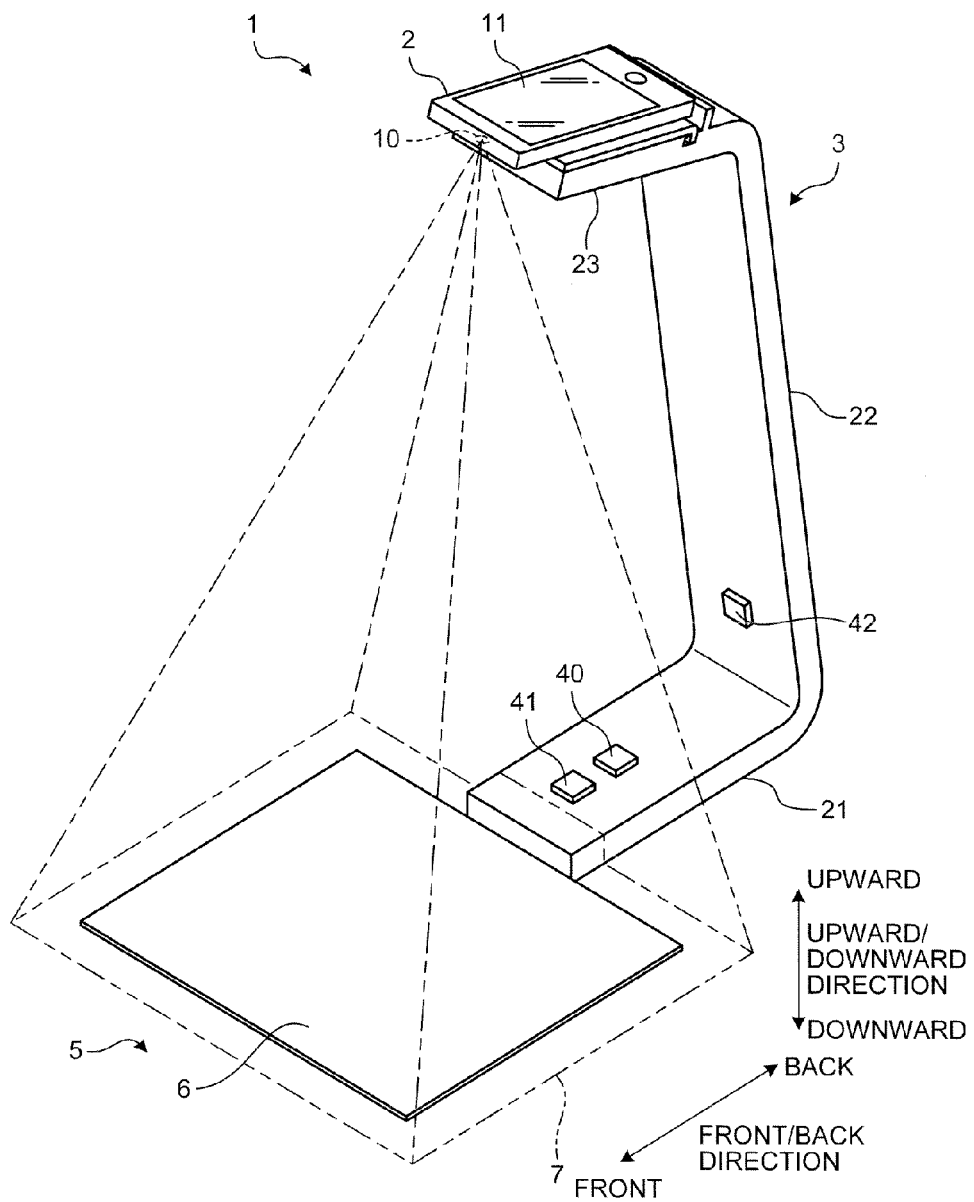
FIG. 1 is a perspective view illustrating a schematic configuration of an image capturing system according to an embodiment of the present invention.
Figure 2:
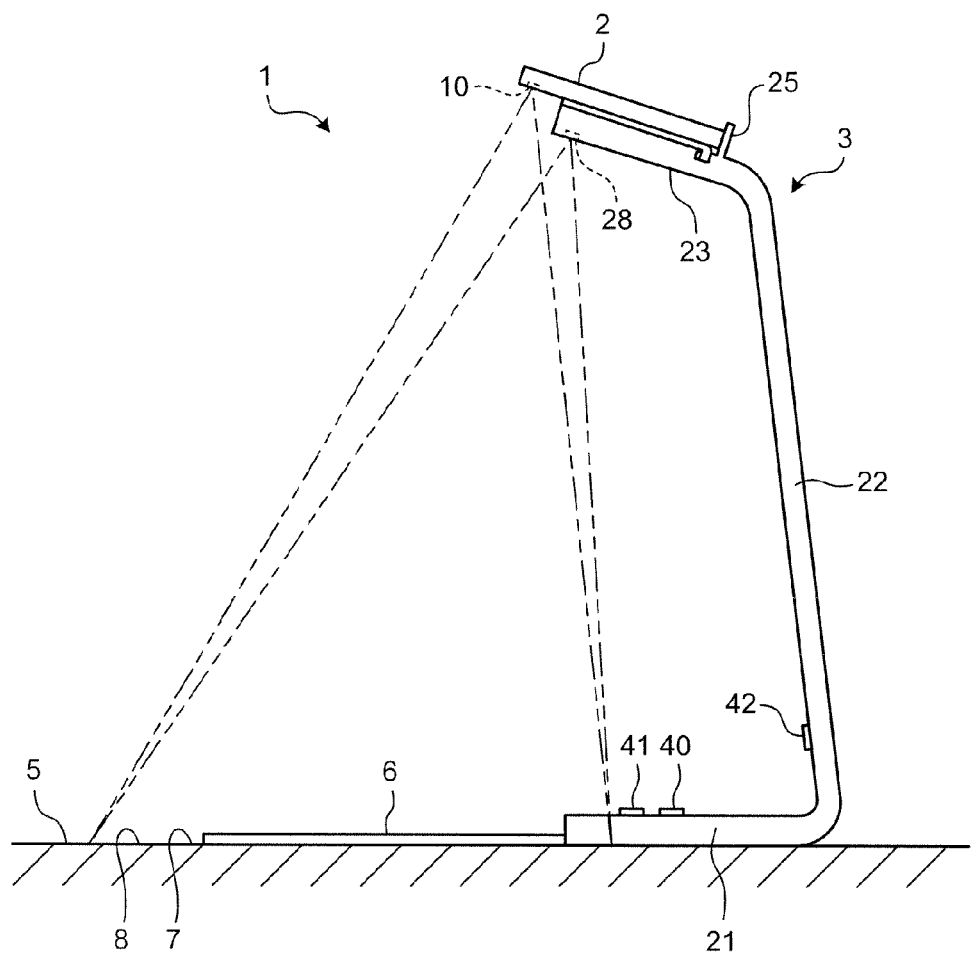
FIG. 2 is a side view of the image capturing system illustrated in FIG. 1.

FIG. 1 is a perspective view illustrating a schematic configuration of an image capturing system according to an embodiment. FIG. 2 is a side view of the image capturing system illustrated in FIG. 1. The image capturing system 1 illustrated in FIGS. 1 and 2 is a scanner system performing a scanning operation by photographing a medium 6 serving as a reading target disposed on a medium installation face 5 from above with a predetermined image capturing unit to generate image data of the medium 6. In the present embodiment, a portable image capturing device 2 having a camera function is used as the image capturing unit. As the portable image capturing device 2, for example, a smartphone having a camera function is used.

The image capturing system 1 according to the present embodiment includes the portable image capturing device 2 and a lighting apparatus 3 on which the portable image capturing device 2 can be mounted when scanning is performed by photographing with the portable image capturing device 2. The image capturing system 1 can acquire a scanned image of a predetermined area 7 to be photographed (hereinafter, photographed area 7) using the portable image capturing device 2 in a state in which the portable image capturing device 2 is mounted at a predetermined position of the lighting apparatus 3 (an image-capturing-device mounting part 30 described later). In the following description, the upward/downward direction in FIG. 1 will be described as the upward/downward direction of the image capturing system 1 and the lighting apparatus 3, the front side in FIG. 1 will be described as the front direction of the image capturing system 1 and the lighting apparatus 3, and the back side in FIG. 1 will be described as the back direction of the image capturing system 1 and the lighting apparatus 3. That is, with respect to the image capturing system 1, specifically, with respect to a base unit 21, as disclosed in FIG. 1, a side facing the medium 6 is defined as the front side of the image capturing system 1 and the lighting apparatus 3, and an opposite side to the front side is defined as the back side of the image capturing system 1 and the lighting apparatus 3. A direction from the back side of the image capturing system 1 toward the front side of the image capturing system is defined as a front direction, and a direction opposite to the front direction is defined as a back direction.

The portable image capturing device 2 is formed in a substantially rectangular plate-like shape, and an image capturing unit 10 performing a camera function is disposed on the back surface thereof. The image capturing unit 10 can Perform a scanning operation in response to an operation command from a control unit 18 (refer to FIG. 7) of the portable image capturing device 2. In a state in which the portable image capturing device 2 is mounted on the image-capturing-device mounting part 30 of the lighting apparatus 3, the image capturing unit 10 can photograph the entire predetermined photographed area 7 and generate a scanned image including the entire photographed area 7. A display unit 11 for displaying various types of information is provided on a surface of the portable image capturing device 2 opposite to a surface on which the image capturing unit 10 is provided. The display unit 11 displays various types of information in operating the portable image capturing device 2, image information in photographing with the image capturing unit 10, and the like.

The lighting apparatus 3 includes three members, that is, a base unit 21, an arm unit 22, and a top unit 23. Among these, the base unit 21 is arranged on the medium installation face 5. The arm unit 22 is connected to the upper surface of the base unit 21 and upwardly extends therefrom. As illustrated in FIGS. 1 and 2, the extending direction of the arm unit 22 may be inclined to the front side (the side on which the medium 6 is disposed) with respect to the vertically upward direction, may be inclined to the back side (the side opposite to the side on which the medium 6 is disposed), or may be the vertically upward direction.

The top unit 23 is connected to the arm unit 22 and extends therefrom facing the medium installation face 5. In the present embodiment, as illustrated in FIG. 2, the top unit 23 is connected to the upper end of the arm unit 22, extends from a height position connected to the arm unit 22 toward the front, and extends obliquely upward with respect to the horizontal direction.

The base unit 21, the arm unit 22, and the top unit 23 of the lighting apparatus 3 are integrally fixed to each other. In other words, a connecting portion between the base unit 21 and the arm unit 22 and a connecting portion between the arm unit 22 and the top unit 23 are fixedly disposed so as not to be deformed such as being rotated, detached/attached, or moved.

Figure 3:
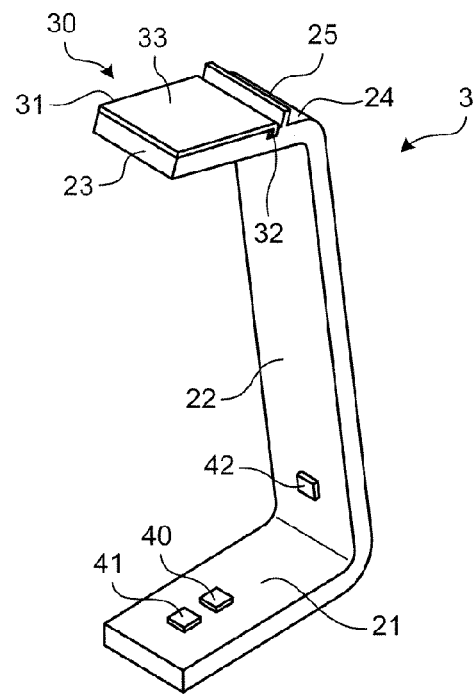
FIG. 3 is a perspective view of a lighting apparatus illustrated in FIG. 1.

FIG. 3 is a perspective view of the lighting apparatus illustrated in FIG. 1. On the upper surface 24 of the top unit 23 of the lighting apparatus 3, the image-capturing-device mounting part 30 is provided to mount the portable image capturing device 2 at a position where the medium 6 disposed on the medium installation face 5 can be photographed. The image-capturing-device mounting part 30 is formed of a plane inclined toward the back side and downward, that is, in a downward direction from the front side to the back side.

On the rear end side of the image-capturing-device mounting part 30, that is, on a side where the arm unit 22 is positioned, and at the end of the image-capturing-device mounting part 30 in the front/back direction thereof, a movement regulation part 25 is provided to regulate the movement of the portable image capturing device 2 mounted on the image-capturing-device mounting part 30. The movement, regulation part 25 has a plate-like shape extending in the right and left direction with thickness direction thereof extending substantially in the front/back direction, and is provided on the upper surface 24 across the right and left ends of the top unit 23. The height of the movement regulation part 25 is higher than that of the portable image capturing device 2 when the portable image capturing device 2 is mounted on the image-capturing-device mounting part 30.

A mirror part 31, which is capable of opening and closing, is arranged on the image-capturing-device mounting part 30. The mirror part 31 is provided on the front side, that is, on the side opposite to the side on which the arm unit 22 is positioned with respect to the movement regulation part 25. The mirror part 31 has a substantially rectangular plate-like shape corresponding to the shape of the top unit 23 in front of the movement regulation part 25. That is, the substantially rectangular mirror part 31 is provided on the upper surface 24 of the top unit 23 so that one side thereof is arranged along the movement regulation part 25 and positioned near and in front of the movement regulation part 25.

In this way, a rotating axis 32 extending in the right and left direction of the top unit 23 is positioned at a part of the mirror part 31 which is near and in front of the movement regulation part 25, and the mirror part 31 can rotate about the rotating axis 32. In other words, the mirror part 31 is rotatably coupled to the top unit 23 with the rotating axis 32.

Figure 4:
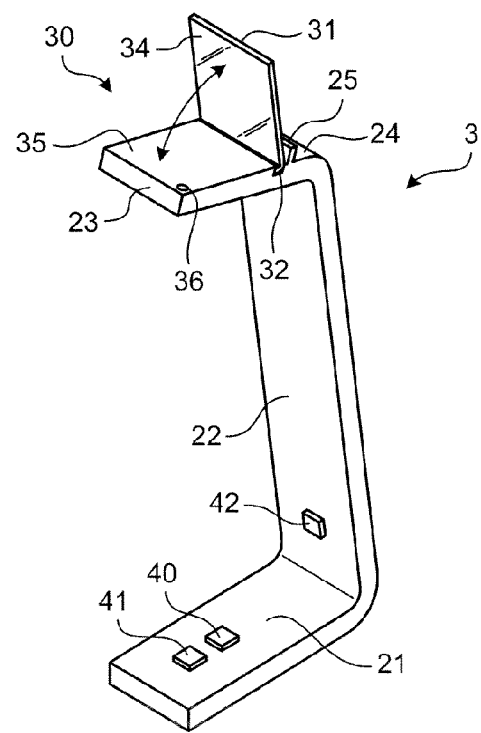
FIG. 4 is an explanatory diagram illustrating a state in which a mirror part illustrated in FIG. 3 is raised.

FIG. 4 is an explanatory diagram illustrating a state in which the mirror part illustrated in FIG. 3 is raised. The mirror part 31 can be raised in the upward direction from the top unit 23 by being rotated about the rotating axis 32. That is, the mirror part 31 can be raised by being rotated about the rotating axis 32, and a plate thickness direction of the raised mirror part 31 is substantially the front/back direction. The surface of the mirror part 31 facing the front when being raised is formed from a mirror 34 serving as a reflection member that reflects light.

The mirror 34 faces substantially the front when the mirror part 31 is raised as described above, and faces downward when the mirror part 31 is put down (refer to FIG. 3). In the mirror part 31 provided to the image-capturing-device mounting part 30, the upper surface thereof in the put-down state, that is, the surface thereof opposite to the side on which the mirror 34 is positioned is provided as a mirror-back mounting face 33 (refer to FIG. 3) serving as a portion on which the portable image capturing device 2 is mounted when the mirror part 31 is put down.

In the state in which the mirror part 31 is raised, the upper surface 24 of the top unit 23 in front of the mirror part 31 is provided as an image-capturing-device mounting face 35 on which the portable image capturing device 2 is mounted when the mirror part 31 is raised. The mirror part 31, which is supported rotatably around the rotating axis 32, is rotatably supported by the image-capturing-device mounting face 35. When the mirror part 31 is raised, the image-capturing-device mounting face 35 and the mirror 34 of the mirror part 31 have such a positional relation that they form an acute angle in a side view. Accordingly, the mirror 34 is arranged to be positioned above the image-capturing-device mounting face 35 included in the image-capturing-device mounting part 30 when the mirror part 31 is raised.

A mirror detection sensor 36 serving as a mirror detector which detects whether the mirror part 31 is raised or put down is arranged on the image-capturing-device mounting face 35 of the top unit 23. As the mirror detection sensor 36, a sensor such as a reflective sensor using infrared rays and the like, or a mechanical switch that detects mechanical contact is used. When the mirror part 31 is put down, the mirror 34 of the mirror part 31 faces the image-capturing-device mounting face 35 and the mirror 34 contacts the mirror detection sensor 36, so that the mirror detection sensor 36 detects that the mirror part 31 is closed. Accordingly, when the mirror detection sensor 36 does not detect the contact of the mirror 34, the mirror 34 of the mirror part 31 is in the raised state away from the image-capturing-device mounting face 35.

In the image capturing system 1, an installation position of the image-capturing-device mounting part 30 is set such that a distance between the image capturing unit 10 and the medium installation face 5, which is appropriate for the image capturing unit 10 of the portable image capturing device 2 to photograph the entire predetermined photographed area 7 below, is kept when the portable image capturing device 2 is mounted on the image-capturing-device mounting part 30. For example, when the mirror part 31 is put down and the portable image capturing device 2 is mounted on the mirror-back mounting face 33 (refer to FIGS. 1 and 2), the photographed area 7 of the portable image capturing device 2, which is mounted on the mirror-back mounting face 33, includes a region in which the medium 6 is arranged, which is adjacent to the front side of the base unit 21 of the lighting apparatus 3, and a front upper surface portion of the base unit 21.

Figure 5:
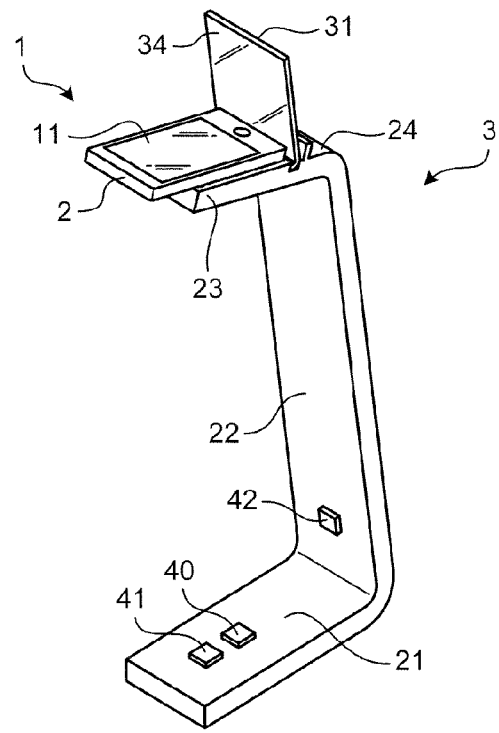
FIG. 5 is a perspective view when a portable image capturing device is mounted on an image-capturing-device mounting face illustrated in FIG. 4.
Figure 6:
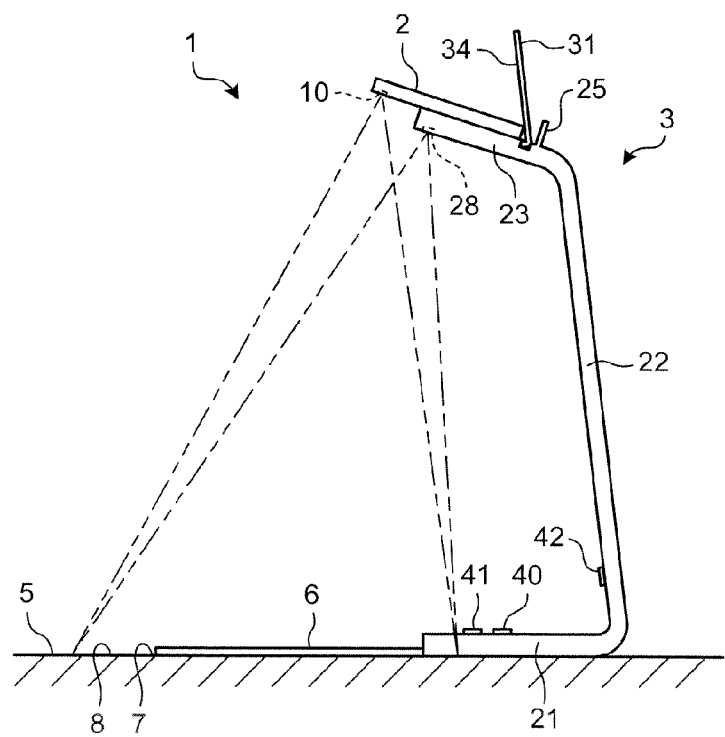
FIG. 6 is a side view of the image capturing system illustrated in FIG. 5.

FIG. 5 is a perspective view when the portable image capturing device is mounted on the image-capturing-device mounting face illustrated in FIG. 4. FIG. 6 is a side view of the image capturing system illustrated in FIG. 5. The image capturing system 1 is configured to keep a distance between the image capturing unit 10 and the medium installation face 5 which is appropriate for the image capturing unit 10 of the portable image capturing device 2 to photograph the entire predetermined photographed area 7 below when the mirror part 31 is raised and the portable image capturing device 2 is mounted on the image-capturing-device mounting face 35. That is, also when the mirror part 31 is raised and the portable image capturing device 2 is mounted on the image-capturing-device mounting face 35, the photographed area 7 of the portable image capturing device 2, mounted on the image-capturing-device mounting face 35, includes the region in which the medium 6 is arranged, which is adjacent to the front of the base unit 21 of the lighting apparatus 3, and the front upper surface portion of the base unit 21.

A scan switch 40 and a lighting switch 41 are provided on the upper surface of the base unit 21 of the lighting apparatus 3. A power switch 42 is provided on the front surface of the arm unit 22. A light-emitting diode (LED) for lighting 28 (hereinafter, lighting LED 28), which serves as a lighting unit for irradiating the medium installation face 5 with light, is provided on the lower surface of the top unit 23 of the lighting apparatus 3 facing the medium installation face 5. The scan switch 40, the lighting switch 41, the power switch 42, and the Lighting LED 28 are electrically connected to a control unit 45 (refer to FIG. 7) included inside the lighting apparatus 3.

The scan switch 40 or the lighting switch 41 may be provided at a position other than the base unit 21. The Power switch 42 may be provided at a portion other than the arm unit 22. The lighting apparatus 3 may be configured without the power switch 42, so that the lighting apparatus 3 will be turned on by insertion of an electric plug which the lighting apparatus 3 is equipped with into a socket.

The scan switch 40 is an input unit to receive, from a user, a scanning operation instruction for the portable image capturing device 2 to perform the scanning operation. The lighting switch 41 is an input unit for switching over ON and OFF of the Lighting LED 28. The power switch 42 is a switch for switching over conduction and non-conduction between an external power supply 48 and the lighting apparatus 3. The Lighting LED 28 is arranged on the lower surface of the top unit 23 so that an irradiation range 8 thereof during light emission is substantially the same as the photographed area 7 of the portable image capturing device 2 and the photographed area 7 can be uniformly illuminated.

Figure 7:
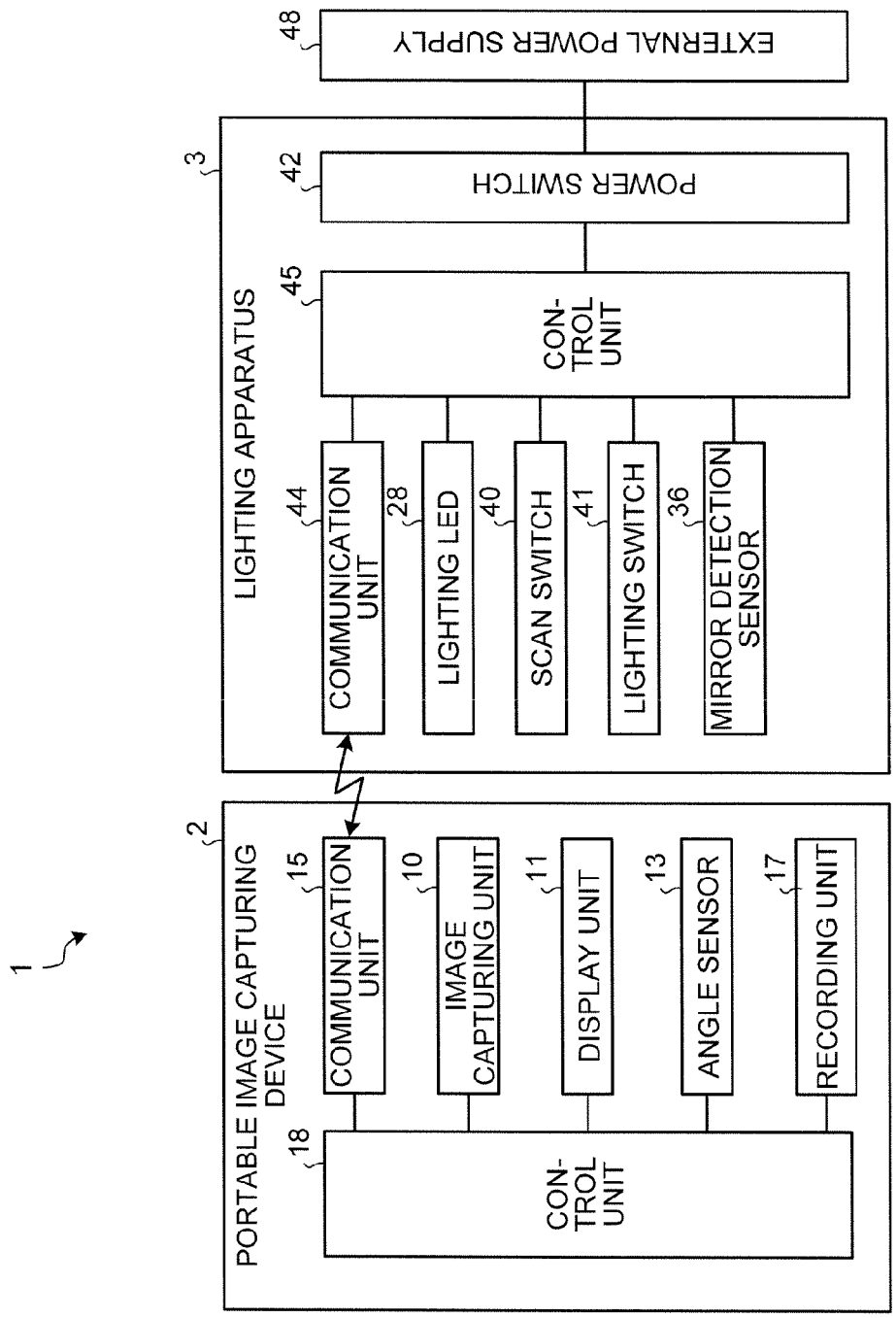
FIG. 7 is a functional block diagram of the image capturing system illustrated in FIG. 1.

FIG. 7 is a functional block diagram of the image capturing system illustrated in FIG. 1. The portable image capturing device 2 composing the image capturing system 1 together with the lighting apparatus 3 includes the image capturing unit 10, the display unit 11, an angle sensor 13, a communication unit 15, a recording unit 17, and the control unit 18. The image capturing unit 10, the display unit 11, the angle sensor 13, the communication unit 15, and the recording unit 17 are electrically connected to the control unit 18.

The angle sensor 13 is an angle detector for detecting an inclination angle of the portable image capturing device 2. The angle sensor 13 can detect a direction of the portable image capturing device 2, a state of change of the direction thereof, and a moving state thereof by detecting the current inclination angle or a change in the inclination angle of the portable image capturing device 2.

The communication unit 15 can communicate with the lighting apparatus 3. The communication unit 15, for example, performs wireless communication via Bluetooth (registered trademark). The communication with the lighting apparatus 3 may be performed by a method other than Bluetooth. Any method, such as near field communication (NFC) or infrared communication, may be employed so long as wireless communication can be performed between the lighting apparatus 3 and the portable image capturing device 2 mounted on the image-capturing-device mounting part 30.

The recording unit 17 is a storage device for storing image data and the like photographed by the image capturing unit 10. The control unit 18 performs various types of arithmetic processing while communication with the lighting apparatus 3 through the communication unit 15 is performed or while photographing with the image capturing unit 10 is performed. The control unit 18 perform, for example, image processing so as to correct an image of the medium 6 on the medium installation face 5 photographed from obliquely above, using the image capturing unit 10 of the portable image capturing device 2 mounted on the image-capturing-device mounting part 30 of the inclined top unit 23, to be an image obtained by photographing the medium 6 from vertically above.

The lighting apparatus 3 includes the mirror detection sensor 36, the Lighting LED 28, the scan switch 40, the lighting switch 41, the power switch 42, a communication unit 44, and the control unit 45. The mirror detection sensor 36, the Lighting LED 28, the scan switch 40, the lighting switch 41, the power switch 42, and the communication unit 44 are electrically connected to the control unit 45.

The communication unit 44 can communicate with the communication unit 15 of the portable image capturing device 2 using Bluetooth and the like. The portable image capturing device 2 and the lighting apparatus 3 can wirelessly communicate with each other through respective communication units 15 and 44.

The control unit 45 is configured to perform driving control of the Lighting LED 28 or transmit a control signal to the communication unit 44 corresponding to an input operation on the scan switch 40 or the lighting switch 41 so as to perform light emission control of the Lighting LED 28 or control the communication between the lighting apparatus 3 and the portable image capturing device 2.

The power switch 42 is interposed between the external power supply 48 and the control unit 45, and can switch over an operation state and a stopping state of the lighting apparatus 3 by switch over conduction (On) and non-conduction (Off) between the control unit 45 and the external power supply 48 through the input operation.

The image capturing system 1 according to the present embodiment is composed as described above. Operations thereof are explained below. The lighting apparatus 3 composing the image capturing system 1 is usually utilized as a desk light. When the lighting apparatus 3 is utilized as the desk light, an input operation such as a pressing operation on the lighting switch 41 is performed in a state in which the power switch 42 is turned on. The input operation to this lighting switch 41 may be other than a strong depression and thus may be a tap on the lighting switch 41 or a contact (touch) with the lighting switch 41 depending on the form of the lighting switch 41.

When the control unit 45 recognizes that the lighting switch 41 is pressed, the control unit 45 turns on the Lighting LED 28. Accordingly, the Lighting LED 28 irradiates the irradiation range 8 with light, and the lighting apparatus 3 can light a part below the top unit 23 with irradiation light from the Lighting LED 28. To turn off the Lighting LED 28 in an ON state, an input operation such as a pressing operation on the lighting switch 41 is performed in a state in which the Lighting LED 28 is turned on. Accordingly, the control unit 45 turns off the Lighting LED 28.

In the image capturing system 1 according to the present embodiment, the lighting apparatus 3 is no only used as the desk light. The portable image capturing device 2 is set on the lighting apparatus 3, so that the portable image capturing device 2 can read the medium 6 disposed on the medium installation face 5 to scan the medium 6. The following describes the scanning operation on the medium 6 with the image capturing system 1. To scan the medium 6, the portable image capturing device 2 is mounted on the image-capturing-device mounting part 30 of the top unit 23 so that the image capturing unit 10 of the portable image capturing device 2 faces downward, the image capturing unit 10 is exposed from the top unit 23, and the display unit 11 faces upward. Specifically, the portable image capturing device 2 is mounted on the mirror-back mounting face 33 when the mirror part 31 is put down, and the portable image capturing device 2 is mounted on the image-capturing-device mounting face 35 when the mirror part 31 is raised.

The portable image capturing device 2 and the lighting apparatus 3 can transmit/receive information to/from each other by performing communication through the communication unit 15 of the portable image capturing device 2 and the communication unit 44 of the lighting apparatus 3. The portable image capturing device 2 can perform an photographing operation by receiving a control signal transmitted from the lighting apparatus 3. In the image capturing system 1, the pressing operation on the scan switch 40 is a trigger for starting the scanning. That is, turning on the scan switch 40 is the trigger for starting the scanning with the image capturing system 1. Due to such a configuration, the portable image capturing device 2 mounted on the top unit 23 of the lighting apparatus 3 continues a standby state until the communication unit 15 receives the trigger for starting the scanning from the lighting apparatus 3.

In this state, when the user presses the scan switch 40 of the lighting apparatus 3, the lighting apparatus 3 transmits the trigger for starting the scanning to the portable image capturing device 2. The trigger for starting the scanning is transmitted from the communication unit 44 of the lighting apparatus 3 and received by the communication unit 15 of the portable image capturing device 2. The portable image capturing device 2 that has received the trigger for starting the scanning performs an instruction for lighting the Lighting LED 28 included in the lighting apparatus 3. After receiving the instruction for lighting from the portable image capturing device 2, the lighting apparatus 3 keeps the ON state of the Lighting LED 28 when the Lighting LED 28 is in the ON state when the instruction for lighting is received, and turns on the Lighting LED 28 when the Lighting LED 28 is in an OFF state.

The portable image capturing device 2 photographs an image of the photographed area 7 on the medium installation face 5 with the image capturing unit 10 in the state in which the Lighting LED 28 is turned on, thereby the portable image capturing device 2 photographs the medium 6 in the photographed area 7, and stores the image data in the recording unit 17 of the portable image capturing device 2. Accordingly, under an optimal environment created by the Lighting LED 28 that is an illumination of its own, the image capturing system 1 photographs and stores the medium 6 to scan the medium 6. To store the image data obtained by the scanning in the recording unit 17, image processing is performed on the image data with the control unit 18 of the portable image capturing device 2 to adjust image quality thereof appropriately, and the image data is recorded in the recording unit 17 to be stored.

In the image capturing system 1, the image data of the medium 6 placed in the photographed area 7 is acquired using the irradiation light from the Lighting LED 28 as described above. In this case, in the portable image capturing device 2, the display unit 11 displays the image being photographed by the image capturing unit 10 all the time in a mode for photographing the image. The user adjusts the position of the medium 6 with respect to the photographed area 7 to acquire a desired image while confirming the state displayed on the display unit 11. In the image capturing system 1 according to the present embodiment, the image displayed on the display unit 11 can be confirmed by a method for directly and visually confirming the display unit 11 and a method for visually confirming the image via the mirror 34.

For example, when the user performs photographing of the medium 6 in a standing state, the mirror part 31 is put down and the portable image capturing device 2 is mounted on the mirror-back mounting face 33 (refer to FIGS. 1 and 2). The portable image capturing device 2 is mounted on the mirror-back mounting face 33 with the display unit 11 thereof facing upward, so that the standing user can visually confirm the display unit 11 from above.

In this case, the top unit 23 extends obliquely upward from the arm unit 22, so that the portable image capturing device 2 mounted on the image-capturing-device mounting face 35 is also inclined in the same direction. Accordingly, a distance between the image capturing unit 10 of the portable image capturing device 2 and the medium installation face 5 decreases toward the base unit 21, and increases away from the base unit 21 toward the front direction. Due to this, the image of a portion away from the base unit 21 photographed by the image capturing unit 10 is smaller than the image of a portion close to the base unit 21 on the medium installation face 5 because the portion away from the base unit 21 is distant from the image capturing unit 10.

Therefore, as in the case of storing the photographed image in the recording unit 17, the control unit 18 corrects a distortion of the image that occurs corresponding to a positional relation between the image capturing unit 10 and the medium installation face 5, and displays the corrected image on the display unit 11. Accordingly, the user can confirm the image to be actually stored that is photographed by the portable image capturing device 2, by visually confirming the image on the display unit 11, so that the user can perform photographing of the medium installation face 5 while confirming the image displayed on the display unit 11.

In contrast, when the user sits down in front of the image capturing system 1 and performs photographing of the medium 6 while facing the image capturing system 1, the mirror part 31 is raised and the portable image capturing device 2 is mounted on the image-capturing-device mounting face 35 (refer to FIGS. 5 and 6). Also in a case in which the portable image capturing device 2 is mounted on the image-capturing-device mounting face 35, the portable image capturing device 2 is mounted such that the display unit 11 faces upward. When the mirror part 31 is raised, the mirror 34 of the mirror part 31 is arranged above and rearward of the display unit 11 and faces substantially the front.

Figure 8:
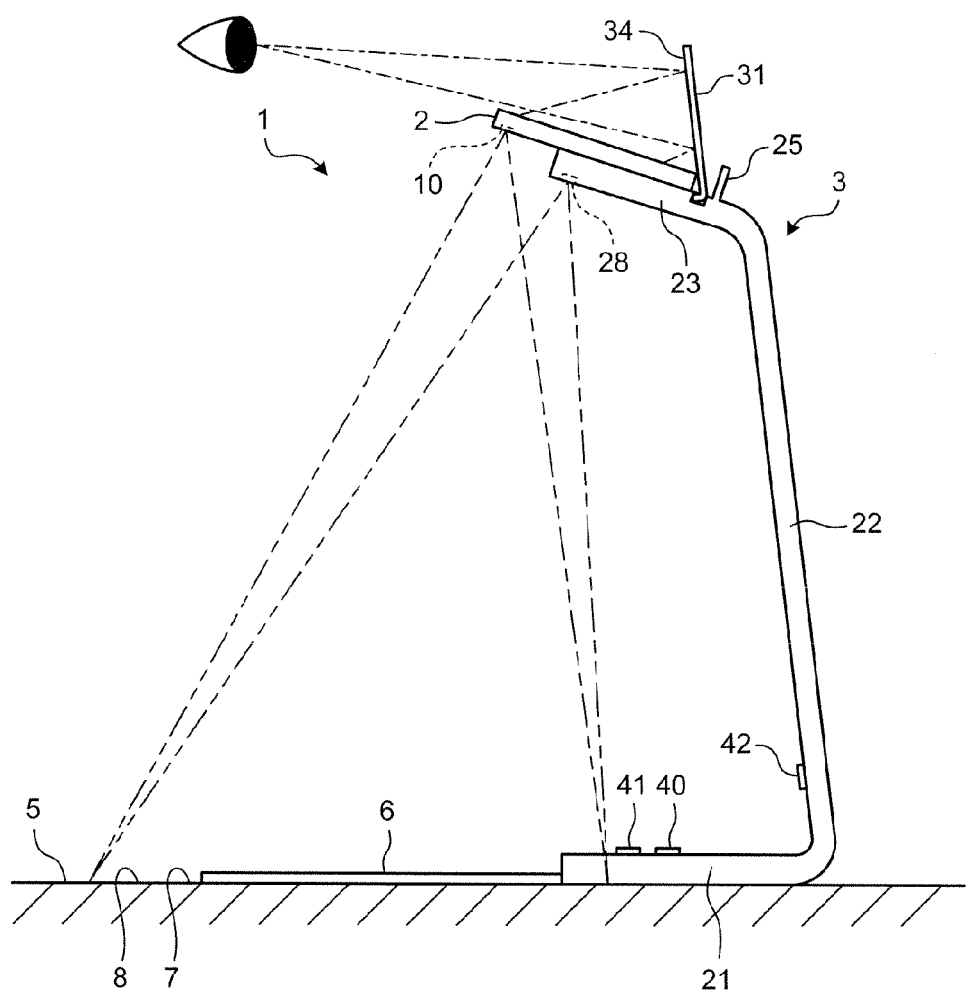
FIG. 8 is an explanatory diagram illustrating a case of visually confirming a display unit by raising the mirror part.

FIG. 8 is an explanatory diagram illustrating a case of visually confirming the display unit by raising the mirror part. When the mirror part 31 is raised, the mirror 34 of the mirror part 31 and the image-capturing-device mounting face 35 form an acute angle in a side view, so that the mirror 34 of the mirror part 31 also forms the acute angle, in a side view, with the display unit 11 of the portable image capturing device 2 mounted on the image-capturing-device mounting face 35.

The top unit 23 extends from the height position connected to the arm unit 22 toward the front and obliquely upward with respect to the horizontal direction. Accordingly, the display unit 11 faces more obliquely rearward than vertically upward. The mirror 34 of the mirror part 31 is positioned above and rearward of the display unit 11, so that the image displayed on the display unit 11 is incident on the mirror 34 and is reflected by the mirror 34. Due to this, the mirror 34 reflects the image displayed on the display unit 11 facing upward toward the medium installation face 5.

In detail, the mirror 34 faces substantially the front, so that the mirror 34 reflects the image on the display unit 11 toward the front. The user sitting in front of the image capturing system 1 can visually confirm the display unit 11 from the front via the mirror 34 by visually confirming the image on the display unit 11 reflected toward the front by the mirror 34.

However, the image reflected by the mirror 34 is an image obtained by inverting an original image. In a case in which the image displayed on the display unit 11 is reflected by the mirror 34 and the reflected image is visually confirmed, a distortion occurs in the image corresponding to the positional relation between the image capturing unit 10 and the medium installation face 5. Accordingly, in a state in which the user visually confirms the image on the display unit 11 via the mirror 34, the image capturing system 1 according to the present embodiment performs correction processing on the image displayed on the display unit 11 so that the image reflected by the mirror 34 can be appropriately seen.

Figure 9:
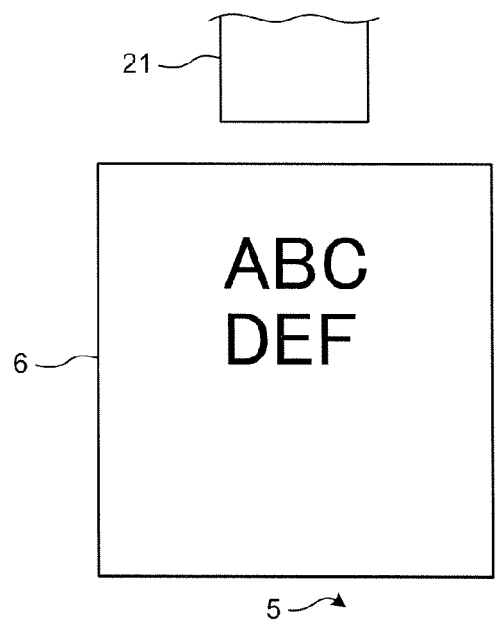
FIG. 9 is a plan view of a medium disposed on a medium installation face.
Figure 10:
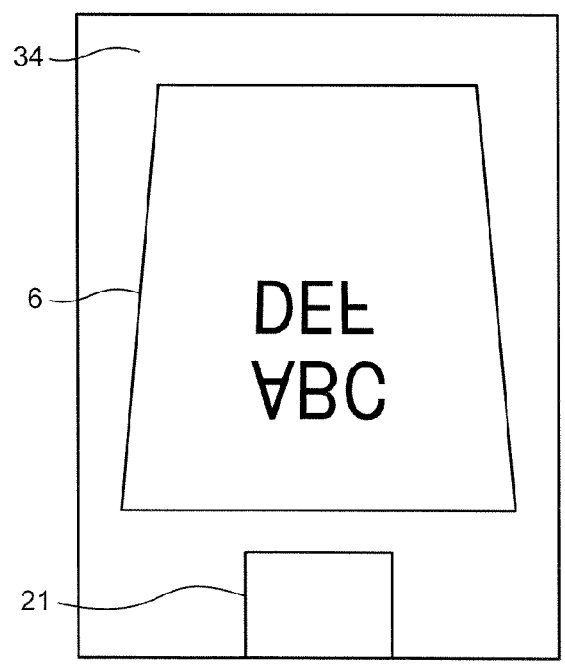
FIG. 10 is an explanatory diagram illustrating a state in which the medium illustrated in FIG. 9 is photographed by an image capturing unit and the image displayed on the display unit is reflected by a mirror.

FIG. 9 is a plan view of the medium disposed on the medium installation face. FIG. 10 is an explanatory diagram illustrating a state in which the medium illustrated in FIG. 9 is photographed by the image capturing unit and the image displayed on the display unit is reflected by the mirror. For example, when the medium 6 disposed on the medium installation face 5 is photographed by the image capturing unit 10 of the portable image capturing device 2 mounted on the image-capturing-device mounting face 35, and displayed on the display unit 11, and when the image displayed on the display unit 11 is reflected by the mirror 34 above the display unit 11, the reflected image is horizontally inverted and a portion of the reflected image away from the base unit 21 to the front becomes smaller.

Figure 11:
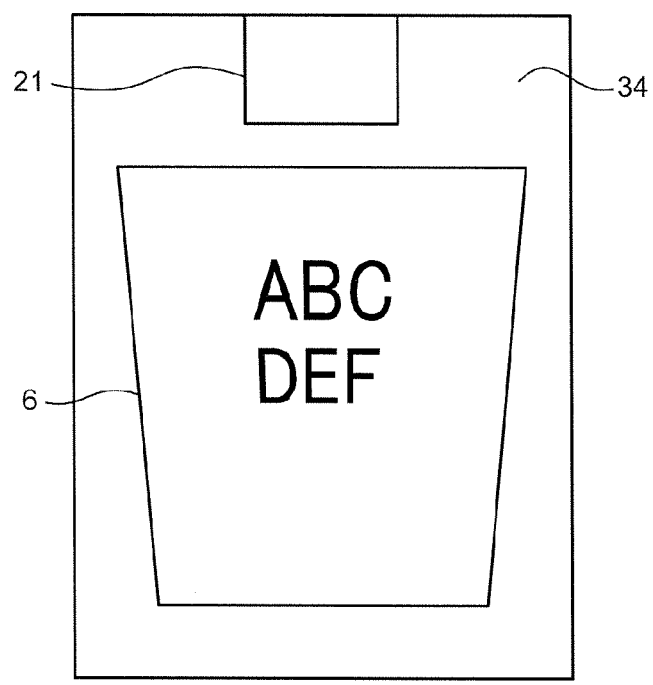
FIG. 11 is an explanatory diagram illustrating a state in which an image that is vertically inverted and displayed on the display unit is reflected by the mirror.

FIG. 11 is an explanatory diagram illustrating a state in which the image, which is vertically inverted and displayed on the display unit, is reflected by the mirror. In a case in which the image on the display unit 11 is visually confirmed by reflecting the image with the mirror 34, the control unit 18 corrects the image to be displayed on the display unit 11 so that the image is vertically inverted when visually confirmed via the mirror 34. That is, to obtain an appropriate view from the user side, the medium 6 placed on the medium installation face 5 is directed such that a part thereof close to the base unit 21 corresponds to the upper part of a written or printed image on the medium 6, and a part thereof closer to the user than the base unit 21 corresponds to the lower part of the written or printed image on the medium 6.

On the other hand, when the image photographed by the image capturing unit 10 is displayed on the display unit 11 as it is and reflected by the mirror 34, the lower side in the mirror 34 corresponds to an image on the base unit 21 side and the upper side in the mirror 34 corresponds to an image close to the user side. To cope with this, the control unit 18 corrects the image visually confirmed via the mirror 34 to be vertically inverted so as to obtain an appropriate view from the user side. Accordingly, regarding the image reflected by the mirror 34, the upper part thereof in the mirror 34 corresponds to the image close to the base unit 21 and the lower part thereof in the mirror 34 corresponds to the image close to the user side. By vertically inverting the image in this way, the image inverted by being reflected by the mirror 34 can be directed in the same direction as in a case in which the object to be photographed is actually viewed.

Figure 12:
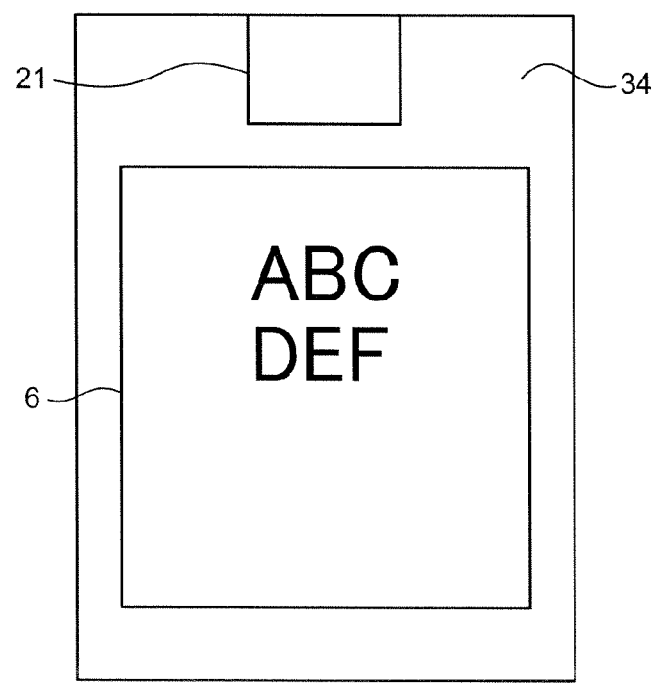
FIG. 12 is an explanatory diagram illustrating a state in which the image that is vertically inverted by the display unit and corrected to remove a distortion is reflected by the mirror.

FIG. 12 is an explanatory diagram illustrating a state in which the image, which is vertically inverted by the display unit and corrected to remove a distortion, is reflected by the mirror. In a case in which the image on the display unit 11 is reflected by the mirror 34 to be visually confirmed, a distortion occurs in the image corresponding to the positional relation between the image capturing unit 10 and the medium installation face 5, so that the control unit 18 corrects the image to remove the distortion also in this case. Accordingly, the user can appropriately confirm the image photographed by the portable image capturing device 2 by visually confirming the image on the display unit 11 reflected by the mirror 34.

The image capturing system 1 perform the correction processing as described above in photographing the medium 6, and the correction processing is changed depending on a state of the mirror part 31 detected by the mirror detection sensor 36. Specifically, when the mirror detection sensor 36 disposed on the image-capturing-device mounting face 35 detects the mirror part 31 in photographing the medium 6, the control unit 18 determines that the mirror part 31 is in a put-down state and that a state where the mirror 34 is arranged above the image-capturing-device mounting face 35 is not detected. In this case, the control unit 18 performs first image correction processing to correct a distortion in the image that occurs corresponding to the positional relation between the image capturing unit 10 and the medium installation face 5, and displays the corrected image on the display unit 11. Accordingly, the user can perform photographing while confirming the image to be actually stored by visually confirming the image displayed on the display unit 11.

In contrast, when the mirror detection sensor 36 does not detect the mirror part 31, the control unit 18 determines that the mirror part 31 is in an raised state and that a state where the mirror 34 is arranged above the image-capturing-device mounting face 35 is detected. In this case, the control unit 18 performs second image correction processing for correcting the distortion and the vertical inversion of the image, and displays the corrected image on the display unit 11. Accordingly, the user can perform photographing while confirming the image to be actually stored by visually confirming the image reflected by the mirror 34 of the mirror part 31.

The image capturing system 1 according to the above embodiment enables the mirror 34, which reflects the image displayed on the display unit 11 of the portable image capturing device 2 toward the medium installation face 5, to be arranged above the image-capturing-device mounting face 35 on which the portable image capturing device 2 is mounted, so that the user can perform photographing of the medium 6 while visually confirming the image reflected by the mirror 34. Further, the mirror detection sensor 36, which detects an arrangement state of the mirror 34, is provided, and in photographing, the control unit 18 of the Portable image capturing device 2 displays the image on the display unit 11 while performing the first image correction processing or the second image correction processing depending on the arrangement state of the mirror 34. Accordingly, the user can perform photographing while confirming the image to be actually stored even in a case of directly visually confirming the display unit 11 or in a case of visually confirming the image via the mirror 34 in photographing. As a result, the user can perform photographing while appropriately recognizing an photographed state regardless of the positional relation between the image capturing system and the user.

The mirror 34 is rotatably supported by the image-capturing-device mounting face 35, and is configured to face the image-capturing-device mounting face 35 in the put-down state and to be arranged above the image-capturing-device mounting face 35 in the raised state. Accordingly, a good external appearance of the lighting apparatus 3 can be ensured when the mirror 34 is not used. In this way, a confirmation performance on the photographed state can be improved in photographing without impairing the good external appearance.

Modification

Figure 13:
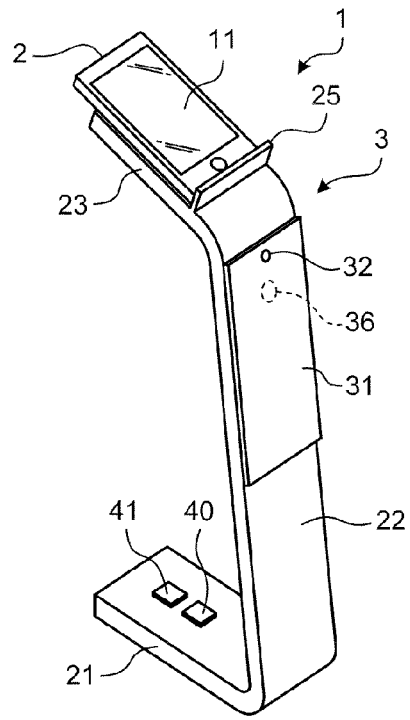
FIG. 13 is a modification of the image capturing system according to the embodiment, and is a perspective view in a case in which the mirror part is provided on an arm unit with the rotating axis thereof provided in the front/back direction.
Figure 14:
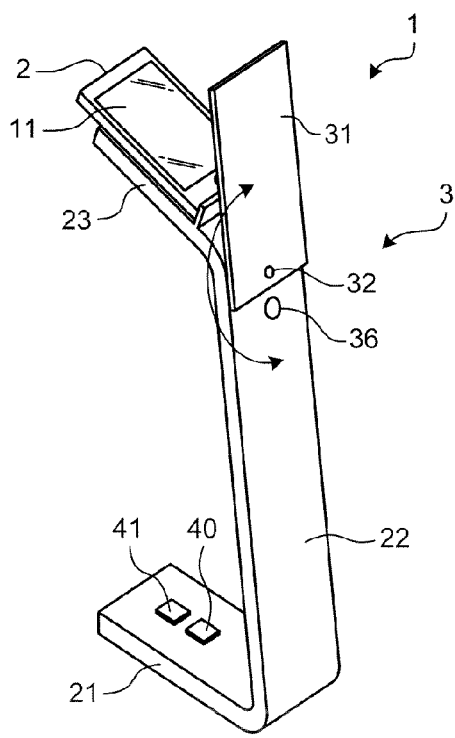
FIG. 14 is an explanatory diagram in a case in which the mirror part of the image capturing system illustrated in FIG. 13 is in a use state.

Although the mirror part 31 is arranged on the upper surface 24 of the top unit 23 in the image capturing system according to the embodiment described above, the mirror part 31 may be arranged at any other position. FIG. 13 shows a perspective view of a modification of the image capturing system according to the embodiment where the mirror part is arranged on the arm unit with the rotating axis thereof provided in the front/back direction. FIG. 14 is an explanatory diagram in a case in which the mirror part of the image capturing system illustrated in FIG. 13 is in a state of being in use. For example, the mirror part 31 may be rotatably arranged about the rotating axis 32 extending in the front/back direction on the rear surface of the arm unit 22. That is, when the mirror part 31 is not used, the mirror part 31 is arranged along the arm unit 22 on the back side of the arm unit 22 (FIG. 13), and when the mirror part 31 is used, the mirror part 31 is rotated about the rotating axis 32 to be positioned above the top unit 23 (FIG. 14). In this case, the mirror part 31 is oriented so that the mirror 34 faces the front side all the time. The mirror detection sensor 36 is also arranged on the back side surface of the arm unit 22 similarly to the mirror part 31 so as to be able to detect the mirror part 31 which is in a state of being arranged along the arm unit 22.

Figure 15:
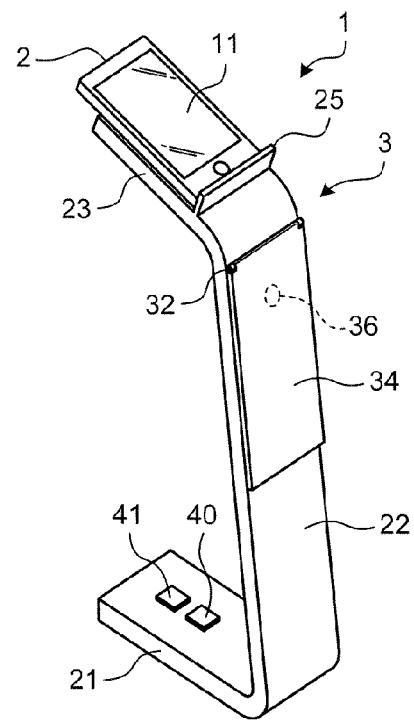
FIG. 15 is a modification of the image capturing system according to the embodiment, and is a perspective view in a case in which the mirror part is provided on the arm unit with the rotating axis thereof provided in the right and left direction.
Figure 16:
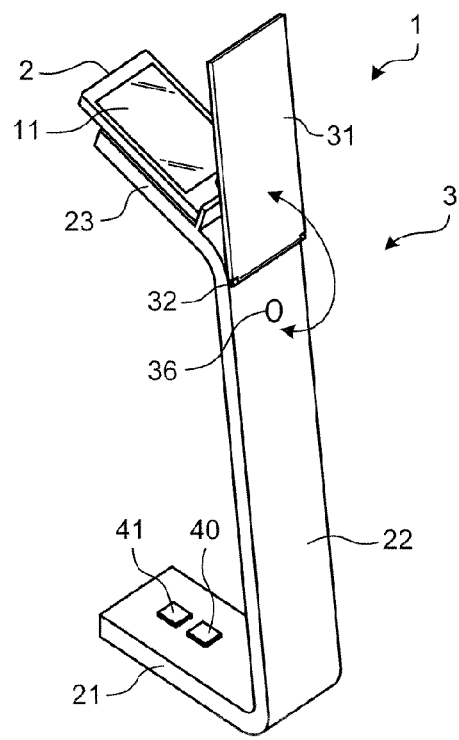
FIG. 16 is an explanatory diagram in a case in which the mirror part of the image capturing system illustrated in FIG. 15 is in a use state.

FIG. 15 is a modification of the image capturing system according to the embodiment, and is a perspective view in a case in which the mirror part is provided on the arm unit with the rotating axis thereof provided in the right and left direction. FIG. 16 is an explanatory diagram in a case in which the mirror part of the image capturing system illustrated in FIG. 15 is in a state of being in use. When the mirror part 31 and the mirror detection sensor 36 are arranged on the back side surface of the arm unit 22, the rotating axis 32 may extend in the right and left direction. Also due to this, when the mirror part 31 is not used, the mirror part 31 is arranged along the arm unit 22 on the back side of the arm unit 22 (FIG. 15), and when the mirror part 31 is used, the mirror part 31 is rotated about the rotating axis 32 to be positioned above the top unit 23 (FIG. 16). In this case, the mirror part 31 is directed so that the mirror 34 faces the back side when the mirror part 31 is not used. In this way, the mirror 34 is arranged to face the front side when the mirror part 31 is rotated to be positioned above the top unit 23.

Figure 17:
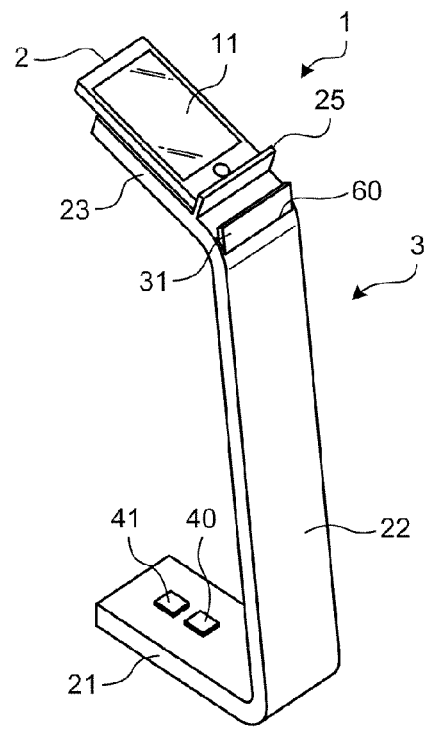
FIG. 17 is a modification of the image capturing system according to the embodiment, and is a perspective view in a case in which an accommodating part for the mirror part is provided on the arm unit.
Figure 18:
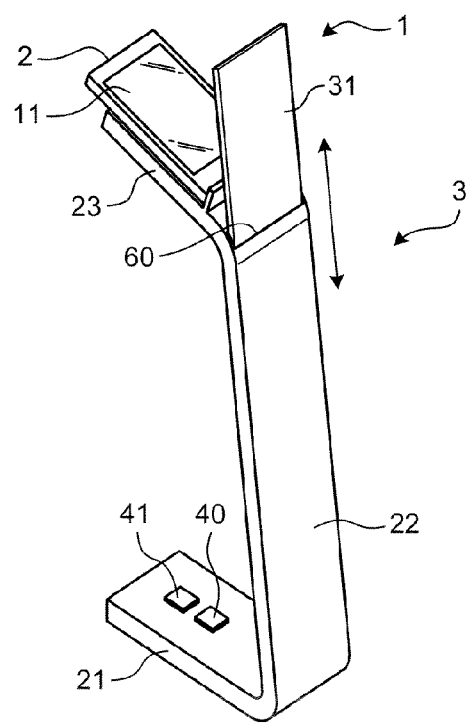
FIG. 18 is an explanatory diagram in a case in which the mirror part of the image capturing system illustrated in FIG. 17 is in a use state.

FIG. 17 is a modification of the image capturing system according to the embodiment, and is a perspective view in a case in which an accommodating part for the mirror part is provided on the arm unit. FIG. 18 is an explanatory diagram in a case in which the mirror part of the image capturing system illustrated in FIG. 17 is in a state of being in use. An accommodating part 60 for accommodating the mirror 34 is formed on the arm unit 22 so that the mirror part 31 is accommodated in the accommodating part 60 when not being used. That is, the accommodating part 60 is formed in the arm unit 22 and has an opening which opens toward upward direction near the upper end of the arm unit 22, and the mirror part 31 is accommodated in the accommodating part 60 such that the mirror 34 faces the front side.

Figure 19:
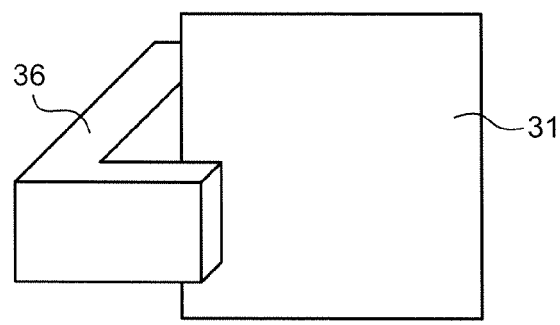
FIG. 19 is an explanatory diagram illustrating a mirror detection sensor included in the image capturing system illustrated in FIG. 17 in a state in which the mirror part is detected.
Figure 20:
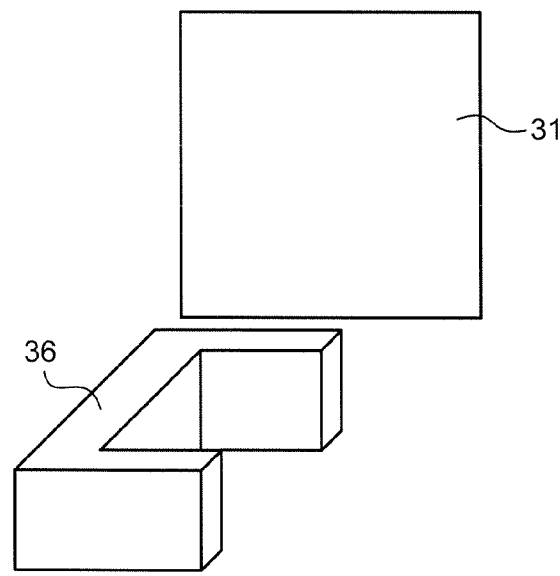
FIG. 20 is an explanatory diagram illustrating the mirror detection sensor included in the image capturing system illustrated in FIG. 17 in a state in which the mirror part is not detected.

FIG. 19 is an explanatory diagram illustrating the mirror detection sensor included in the image capturing system illustrated in FIG. 17 in a state in which the mirror part is detected. FIG. 20 is an explanatory diagram illustrating the mirror detection sensor included in the image capturing system illustrated in FIG. 17 in a state in which the mirror part is not detected. When the image capturing system is embodied to have the accommodating part 60 in which the mirror part 31 is accommodated, it is preferable to use, as the mirror detection sensor 36, a transmission-type sensor that detects whether a member to be detected is positioned between a pair of detection members. The mirror detection sensor 36 is arranged within the accommodating part 60. When the mirror part 31 is accommodated in the accommodating part 60 and the mirror part 31 is positioned between the detection members of the mirror detection sensor 36, the mirror detection sensor 36 detects that the mirror part 31 is accommodated in the accommodating part 60 (FIG. 19). In contrast, when the mirror part 31 is pulled out from the accommodating part 60 and the mirror part 31 is not positioned between the detection members of the mirror detection sensor 36, the mirror detection sensor 36 detects that the mirror part 31 is pulled out from the accommodating part 60 and the mirror 34 is arranged above the image-capturing-device mounting face 35 (FIG. 20).

In this way, when the accommodating part 60 is formed in the arm unit 22 to accommodate the mirror part 31 in the accommodating cart 60, the mirror part 31 cannot be easily visually confirmed when not being used. Accordingly, it is possible to more securely improve an external design when the mirror part 31 is not used.

Figure 21:
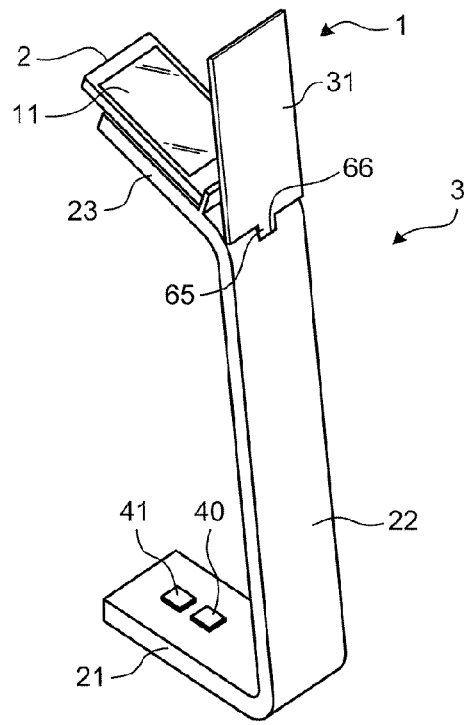
FIG. 21 is a modification of the image capturing system according to the embodiment, and is a perspective view in a case in which the mirror part is an insertion type.
Figure 22:
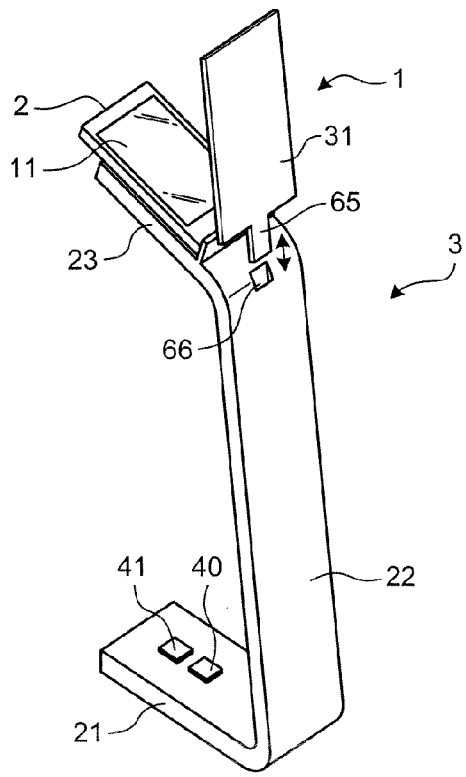
FIG. 22 is an explanatory diagram in a case in which the mirror part of the image capturing system illustrated in FIG. 21 is detached.

FIG. 21 is a modification of the image capturing system according to the embodiment, and is a perspective view in a case in which the mirror part is an insertion type. FIG. 22 is an explanatory diagram in a case in which the mirror part of the image capturing system illustrated in FIG. 21 is detached. The mirror part 31 may be detachable from the lighting apparatus 3. As illustrated in FIGS. 21 and 22, for example, an insertion part 65 is provided on the mirror part 31, and an insertion port 66, into which the insertion part 65 of the mirror part 31 can be inserted, is provided at the upper end of the arm unit 22. In this case, as the mirror detector to detect that the mirror 34 is arranged above the image-capturing-device mounting face 35, an attachment/detachment detector (not illustrated) is provided at the insertion port 66 to detect whether the insertion part 65 is inserted into the insertion port 66. When photographing is performed by the portable image capturing device 2, the attachment/detachment detector detects whether the insertion part 65 is inserted into the insertion port 66, and the control unit 18 performs the first image correction processing or the second image correction processing corresponding to the detection result. In this way, the use of a detachable mirror part 31 can improve the external design when the mirror part 31 is not used and require no rotation mechanism of the mirror part 31, thereby simplifying the configuration.

Figure 23:
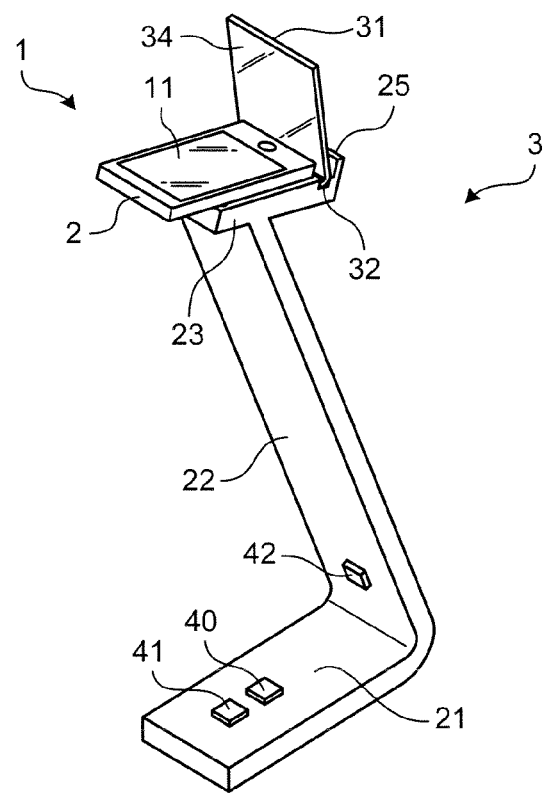
FIG. 23 is a modification of the image capturing system according to the embodiment, and is a perspective view in a case in which the arm unit is connected to the middle of a top unit.

FIG. 23 is a modification of the image capturing system according to the embodiment, and is a perspective view in a case in which the arm unit is connected to the middle part of the top unit. The upper end of the arm unit 22 may be connected to a part other than the back side end of the top unit 23. As illustrated in FIG. 23, for example, the upper end of the arm unit 22 may be connected to the vicinity of the middle in the front/back direction of the lower surface of the top unit 23. As described herein, a form of connection between the top unit 23 and the arm unit 22, a form of connection between the arm unit 22 and the base unit 21, and a shape of each member may be any form or shape other than those described above.

Although the image data photographed by the portable image capturing device 2 is stored in the recording unit 17 of the portable image capturing device 2 in the image capturing system 1 described above, the image data may be stored in any place other than the portable image capturing device 2. For example, after performing photographing with the portable image capturing device 2, the image data may be transferred to the lighting apparatus 3 and stored therein, or may be transferred to an external server and stored therein.

In the image capturing system 1 described above, although a smartphone is exemplified as the portable image capturing device 2 for photographing the medium 6 disposed on the medium installation face 5, any device other than the smartphone may be used as the portable image capturing device 2. The portable image capturing device 2 may be, for example, a digital camera having a function for communicating with the lighting apparatus 3. The portable image capturing device 2 may have any configuration so long as it can perform photographing based on a scanning trigger transmitted from the lighting apparatus 3 by communicating with the lighting apparatus 3.

The image capturing system according to the present invention enables the user to perform photographing while appropriately recognizing an photographed state regardless of the positional relation between the image capturing system and the user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image capturing system comprising:
   a portable image capturing device that includes,
      an image capturing unit,
      a display unit that displays an image photographed by the image capturing unit, and
      a control unit configured to control the portable image capturing device; and
   a lighting apparatus that includes,
      a base unit disposed on a medium installation face on which a medium can be placed,
      an arm unit extending upward from the base unit,
      a top unit extending from the arm unit and facing the medium installation face,
      an image-capturing-device mounting face arranged on the top unit and on which the portable image capturing device is mounted so that the image capturing unit can photograph the medium installation face,
      a lighting unit that irradiates the medium installation face with light,
      a mirror that is arranged above the image-capturing-device mounting face to reflect the image displayed on the display unit toward the medium installation face, and
      a mirror detector that detects that the mirror is arranged, wherein
   the lighting apparatus and the portable imaging device communicate with each other, and
   the control unit
      performs first image correction processing for correcting a distortion in the image that occurs corresponding to a positional relation between the image capturing unit and the medium installation face and displays the corrected image on the display unit when the mirror is not detected by the mirror detector, or
      performs second image correction processing for correcting the distortion and a vertical inversion of the image and displays the corrected image on the display unit when the mirror is detected by the mirror detector.

2. The image capturing system according to claim 1, wherein
   the arm unit includes an accommodating part that accommodates the mirror, and
   the mirror detector detects that the mirror is moved from the accommodating part to be arranged above the image-capturing-device mounting face.

3. The image capturing system according to claim 1, wherein
   the mirror is rotatably supported by the image-capturing-device mounting face, faces the image-capturing-device mounting face in a put-down state, and is arranged above the image-capturing-device mounting face in an raised state, and
   the mirror detector detects that the mirror is raised.

* * * * *